(12) United States Patent
Biebighäuser et al.

(10) Patent No.: US 10,468,929 B2
(45) Date of Patent: Nov. 5, 2019

(54) ROTOR FOR A ROTATING ELECTRICAL MACHINE

(71) Applicant: Cummins Generator Technologies Limited, Stamford (GB)

(72) Inventors: Andreas Biebighäuser, Ingolstadt (DE); Adrian Ghita, Ingolstadt (DE)

(73) Assignee: Cummins Generator Technologies Limited, Peterborough (GB)

(*) Notice: Subject to any disclaimer, the term of this patent is extended or adjusted under 35 U.S.C. 154(b) by 755 days.

(21) Appl. No.: 14/898,716

(22) PCT Filed: Jun. 19, 2014

(86) PCT No.: PCT/GB2014/051882
§ 371 (c)(1),
(2) Date: Dec. 15, 2015

(87) PCT Pub. No.: WO2014/202985
PCT Pub. Date: Dec. 24, 2014

(65) Prior Publication Data
US 2016/0118851 A1    Apr. 28, 2016

(30) Foreign Application Priority Data
Jun. 21, 2013    (GB) .................................... 1311056.4

(51) Int. Cl.
*H02K 3/20* (2006.01)
*H02K 1/24* (2006.01)
*H02K 15/02* (2006.01)

(52) U.S. Cl.
CPC ................. *H02K 3/20* (2013.01); *H02K 1/24* (2013.01); *H02K 15/024* (2013.01)

(58) Field of Classification Search
CPC .................................... H02K 3/20; H02K 1/24
(Continued)

(56) References Cited

U.S. PATENT DOCUMENTS 1,945,028 A * 1/1934 Almaine ................ H02K 19/14
310/163
6,396,188 B1 * 5/2002 Kliman .................... H02K 3/20
310/261.1

(Continued)

FOREIGN PATENT DOCUMENTS

CN    201584875 U    9/2010
JP    54-127508    10/1979
(Continued)

OTHER PUBLICATIONS

International Search Report and Written Opinion for PCT/GB2014/051882, dated Aug. 28, 2015, 18 pages.
(Continued)

*Primary Examiner* — Terrance L Kenerly
(74) *Attorney, Agent, or Firm* — Foley & Lardner LLP

(57) ABSTRACT

A rotor (14) for a rotating electrical machine is disclosed. The rotor (14) comprises a plurality of poles (24), each of the poles comprising a plurality of damper slots (30) for damper bars (32). The rotor is designed for use with a machine having a stator (12) with a plurality of stator slots (22) for accommodating stator windings (18). The damper slots (30) in the rotor have a damper slot pitch which is different from a stator slot pitch, and an arrangement which varies from one pole to another. This may lead to a reduction in higher harmonics.

20 Claims, 5 Drawing Sheets

(58) Field of Classification Search
USPC .......................................................... 310/183
See application file for complete search history.

(56) References Cited

U.S. PATENT DOCUMENTS

| | | | | |
|---|---|---|---|---|
| 2009/0243422 | A1* | 10/2009 | Atarashi | ................ H02K 1/165 310/216.074 |
| 2012/0211981 | A1 | 8/2012 | De Wergifosse | |

FOREIGN PATENT DOCUMENTS

| | | |
|---|---|---|
| JP | 57-95143 | 6/1982 |
| JP | 57-97353 | 6/1982 |
| JP | 01-138954 | 5/1989 |
| JP | 04-172933 | 6/1992 |
| JP | 11-103548 | 4/1999 |
| JP | 2000-116040 | 4/2000 |
| JP | 2010-200506 | 9/2010 |

OTHER PUBLICATIONS

United Kingdom Search Report for GB1311056.4, dated Nov. 29, 2013, 3 pages.

* cited by examiner

ROTOR FOR A ROTATING ELECTRICAL MACHINE

CROSS-REFERENCE TO RELATED APPLICATION

The present application is a U.S. national stage application claiming the benefit of International Application No. PCT/GB2014/051882, filed on Jun. 19, 2014, which claims priority from British Patent Application No. GB1311056.4 filed Jun. 21, 2013, the entire contents of which are incorporated herein by reference in their entirety.

The present invention relates to a rotor for a rotating electrical machine, and in particular an electrical machine of a salient pole design with damper bars in the poles. The present invention has particular, but not exclusive, application with synchronous electrical machines designed for connection to an electrical grid.

A synchronous electrical machine is a rotating machine in which the frequency of rotation is synchronized with the frequency of the electrical grid. The machine may be operable as a motor or a generator, or both.

A synchronous machine usually contains damper bars in the rotor. The damper bars are bars of electrically conducting, non-magnetic material such as copper or aluminium which pass through the rotor and are connected at each end. Currents induced in the damper bars help to dampen out any irregularities which may occur during transient conditions or due to non-symmetrical loads.

When a synchronous machine is connected to a grid, it is necessary for the machine to conform to certain standards (e.g. IEC 60034, NEMA MG1). These standards may specify that the harmonic distortion in the output voltage does not exceed a certain amount. It is therefore necessary to take measures when designing a synchronous machine to ensure that the harmonic distortion in the output is within acceptable limits.

A known technique for reducing the harmonic distortion in the output of a synchronous machine is known as skewing. In a skewed machine, either the stator core or the rotor core is arranged such that the windings run in a direction which is slightly offset from an axial direction of the machine. Typically the amount of skewing is one stator slot over the core length.

A skewed machine can help to achieve an acceptable level of harmonic distortion. However a skewed machine suffers from certain disadvantages, such as a reduction in power density, additional axial forces on the bearing, and more complex manufacturing. It would therefore be desirable to provide a synchronous machine which could achieve an acceptable level of distortion without the need for skewing.

Synchronous electrical machines are sometimes produced as a standard basic machine with a number of different stator designs. Each stator design may have, for example, a different number of stator slots for carrying stator windings, which results in a different stator slot pitch. The different stator designs may be required, for example, to produce different output voltages or to supply different loads. By supplying a standard machine with a number of different stator designs, some of the parts can be produced in common, thereby reducing manufacturing costs. Typically a number of different rotor designs are also required.

According to a first aspect of the present invention there is provided a rotor for a rotating electrical machine, the machine comprising a stator with a plurality of stator slots for accommodating stator windings, wherein:

the rotor comprises a plurality of poles, each of the poles comprising a plurality of damper slots for damper bars;
the damper slots have a damper slot pitch which is different from a stator slot pitch; and
the damper slots have an arrangement which varies from one pole to another.

It has been discovered pursuant to the present invention that, by applying the above measures individually or in combination, it may be possible to produce a single rotor design which can achieve an acceptable reduction in harmonics when used with a plurality of different stator designs, without the need for skewing.

Thus the present invention may provide the advantage that higher harmonics in the rotor's magnetic field may be reduced, which in turn can lead to a reduction in the higher harmonics in the stator winding voltage, without the need for skewing. The present invention may also provide the advantage that an acceptable reduction in harmonics can be achieved with a single rotor design for use with a plurality of different stator designs.

Preferably the damper slots have a damper slot pitch which is different from the stator slot pitch of a stator or set of stators with which the rotor is designed to be used.

Preferably the rotor is arranged such that an air gap between the rotor and the stator is graded.

In a rotating electrical machine with a graded air gap, the air gap between the rotor and the stator varies. Since the inside of the stator is usually cylindrical, this is usually achieved by varying the radius of the rotor. For example, the radius of the rotor may be smaller at the pole edges than at the centre of the pole, which may result in an air gap which is larger at the pole edges than at its centre. This may be achieved, for example, by arranging the end of the pole to have a curved surface with a radius of curvature which is smaller than the radius of the pole. The air gap may be graded such that a ratio of the air gap at a pole edge to the air gap at the centre of the pole is greater than 110% or 115%, and preferably equal to or greater than 120%, although other values may be used.

A damper slot arrangement preferably comprises a plurality of spaced damper slots having a damper slot pitch. The damper slot pitch is preferably the distance between the corresponding parts of two adjacent damper slots (for example, the distance between the centres of two adjacent slots). Similarly the stator slot pitch is preferably the distance between the corresponding parts of two adjacent stator slots.

In a preferred embodiment of the invention, the damper slot pitch is between 105% and 150% or between 70% and 95% of the stator slot pitch. It has been found that, in combination with other measures, this can allow a single rotor design to be used with a plurality of different stator designs, while achieving an acceptable reduction in harmonics without the need for skewing In order to achieve a damper slot arrangement which varies from one pole to another, the damper slots may be arranged non-symmetrically about a centre of the pole. The centre of the pole preferably corresponds to a radial line through the pole, when considering the pole in axial cross-section. For example, the damper slots may be non-symmetrical about a plane running radially and axially through the centre of the pole. By having a non-symmetrical arrangement which differs from one pole to another, it may be possible to reduce higher harmonics in the rotor field.

A non-symmetrical arrangement may be achieved, for example, by having a damper slot arrangement which is displaced from the centre of the pole. For example, the centre point in the damper slot arrangement may be displaced from the centre of the pole. The damper slot arrangement may be displaced by, for example, greater than 10% or 15% or 20% and/or less than 40% or 35% or 30% of a damper slot pitch. In a preferred embodiment the damper slot arrangement is displaced by between 18% and 35% of a damper slot pitch, although other ranges and end values may be used.

Adjacent poles may have damper slot arrangements which are displaced from the centre of the pole in opposite directions. For example, adjacent poles may have damper slot arrangements which are displaced from the centre of the pole by substantially equal and opposite amounts. This may help to reduce higher harmonics in the rotor field.

The damper slots in one pole may be displaced in comparison to corresponding damper slots in an adjacent pole by between 20% and 80% of a damper slot pitch, for example.

In another embodiment, a damper slot arrangement which varies from one pole to another is achieved by varying the number of damper slots. For example, alternate poles may have alternating numbers of damper slots. This may be achieved, for example, by providing every other pole with one or more extra damper slot. Thus, for example, alternate poles may have odd and even numbers of damper slots.

In this case each of the damper slots arrangements may be substantially symmetrical about the centre of the pole, although non-symmetrical arrangements are also possible. For example, each pole may have a damper slot arrangement which is displaced from the centre of the pole by between 0% and 8% of the damper slot pitch.

Preferably the damper slots of one pole are arranged with respect to the damper slots of another pole such that, in operation, a harmonic in the rotor's magnetic field is reduced, in comparison to the case where all poles have the same damper slot arrangement.

In any of the above arrangements the damper slots preferably run axially through the machine, and the rotor preferably includes damper bars located in the damper slots. The poles are preferably alternate north and south poles, and are preferably spaced circumferentially about the rotor.

Preferably a damper slot arrangement has a substantially constant damper slot pitch, although it would be possible for the pitch to vary either within a pole or between poles.

As discussed above, rotating electrical machines are sometimes produced as a standard basic machine with a number of different stator designs. In one embodiment of the invention, the rotor is designed for use with a plurality of different stator designs each having a different number of stator slots and/or a different stator slot pitch. This can allow a universal rotor design to be produced, thereby reducing the number of variants and hence the overall cost of production.

Preferably the damper slots have a damper slot pitch which is different from the stator slot pitches of all of the stators with which the rotor is to be used.

The plurality of different stator designs may have a plurality of different stator slot pitches, and the damper slots may be displaced by, for example, between 20% and 30% of a median stator slot pitch. In the case of an even number of stator designs, the median may be taken as, for example, the average of the two actual median values. The displacement may be with respect to the centre of the pole or with respect to a stator slot. For example, the displacement may be with respect to a stator slot in the stator having the median stator slot pitch, when the rotor pole is aligned with the stator pole.

Alternatively or in addition, the damper slots may have a damper slot pitch which is between two median stator slot pitches. In the case of an odd number of stator designs, the two median values may be taken as the actual median value and an adjacent value.

It has been found pursuant to the present invention that the above arrangements can allow a rotor design to be produced in which a reduction in the higher harmonics can be achieved for a variety of different stator designs.

According to another aspect of the present invention there is provided a set of parts for a rotating electrical machine, the set of parts comprising a plurality of stators with different stator designs, and a rotor in any of the forms described above.

According to another aspect of the present invention, there is provided a rotating electrical machine comprising a rotor in any of the forms described above, a stator with a plurality of stator slots for accommodating stator winding, and an air gap between the rotor and the stator. The rotating electrical machine may be a synchronous machine or any other type of machine with damper slots. The machine may be of a type in which the rotor is located inside the stator, or any other type.

Preferably the damper slots in a rotor pole are arranged such that, when the rotor pole is aligned with a stator pole, the damper slots are displaced with respect to the stator slots. For example, the damper slots may be displaced by greater than 10% or 15% or 20% and/or less than 40% or 35% or 30% of a stator slot pitch. In a preferred embodiment, the damper slots are displaced by between 18% and 35% of a stator slot pitch. Preferably the damper slots in one pole are displaced in the opposite direction to the damper slots in an adjacent pole.

It has been found that, by applying the above measures individually or in combination, it may be possible to achieve a rotor design with acceptable levels of harmonics without the need for skewing. Thus the machine may be un-skewed, that is, it may have an un-skewed rotor and/or stator.

According to another aspect of the present invention there is provided a method of manufacturing a rotor for a rotating electrical machine, the machine comprising a stator with a plurality of stator slots for accommodating stator windings, and the rotor comprising a plurality of poles, each of the poles comprising a plurality of damper slots for damper bars, the method comprising:

arranging the damper slots to have a damper slot pitch which is different from the stator slot pitch; and varying a damper slot arrangement from one pole to another.

The method may further comprise arranging the rotor such that an air gap between the rotor and the stator is graded.

The rotor may be designed for use with a plurality of different stator designs each having a different number of stator slots and/or a different stator slot pitch. In this case, the damper slots are preferably arranged to have a damper slot pitch which is different from the stator slot pitches of all of the stators with which the rotor is to be used.

The air gap may be graded such that a ratio of the air gap at a pole edge to the air gap at the centre of the pole is equal to or greater than 120%. The damper slot pitch may be between 105% and 150% or between 70% and 95% of the stator slot pitch.

A damper slot arrangement may be displaced from the centre of the pole. The amount of displacement may be, for example, between 18% and 35% of a damper slot pitch.

The number of damper slots may vary from one pole to another. In this case, a damper slot arrangement may be displaced from the centre of the pole by between 0% and 8% of the damper slot pitch.

Features of one aspect of the invention may be provided with any other aspect. Any of the apparatus features may be provided as method features and vice versa.

In this specification the terms "axially", "radially", "circumferentially" and so forth are generally used with respect to the axis of rotation of the machine.

Preferred features of the present invention will now be described, purely by way of example, with reference to the accompanying drawings, in which.

Figure 1:
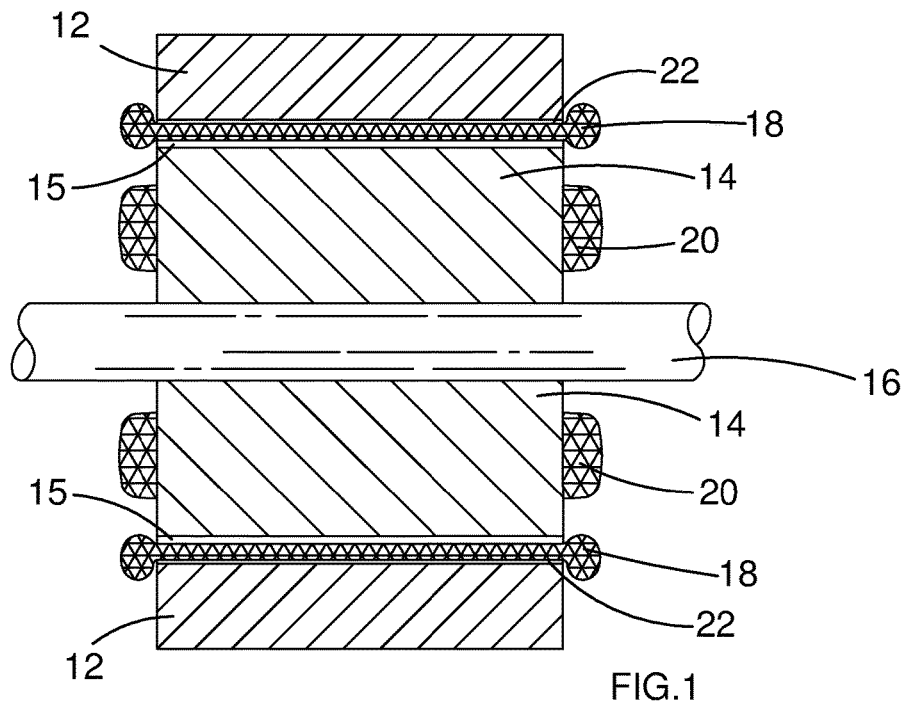
FIG. 1 is a cross section through parts of a synchronous electrical machine.

FIG. 1 is a cross section through parts of a synchronous electrical machine. The machine comprises a rotor 14 which is arranged to rotate inside a stator 12. The rotor is supported on a rotor shaft 16 which defines an axis of rotation of the machine. The rotor and stator are both formed from laminated sheets of metal. The stator 12 includes stator windings 18 which are accommodated in stator slots 22. The rotor includes rotor windings 20, which are wound on salient poles extending radially outwards from the centre of the rotor.

In operation, an electrical current flowing in the rotor windings 20 causes a magnetic flux to flow across an air gap 15 between the rotor and the stator. When the machine is operated as a generator, the rotor is rotated by a prime mover and the rotating magnetic field induces a voltage in the stator windings.

When the machine is operated as a motor, a voltage is applied to the stator windings and the thus generated magnetic field causes the rotor to rotate.

In a synchronous machine, the rotor speed is synchronous with the power supply or electrical grid to which the machine is connected. For example, in a synchronous generator, the rotor speed is such as to generate an output voltage which is at the same frequency as the electrical grid. Torque is generated by the interaction between the magnetic field of the stator winding currents and the magnetic field of the rotor winding current. The size of the torque depends on the size of the currents and the phase angle between the magnetic fields. The rotor magnetic field is fixed with respect to the rotor, while the stator magnetic field rotates with respect to the stator due to the AC currents in the windings.

Figure 2:
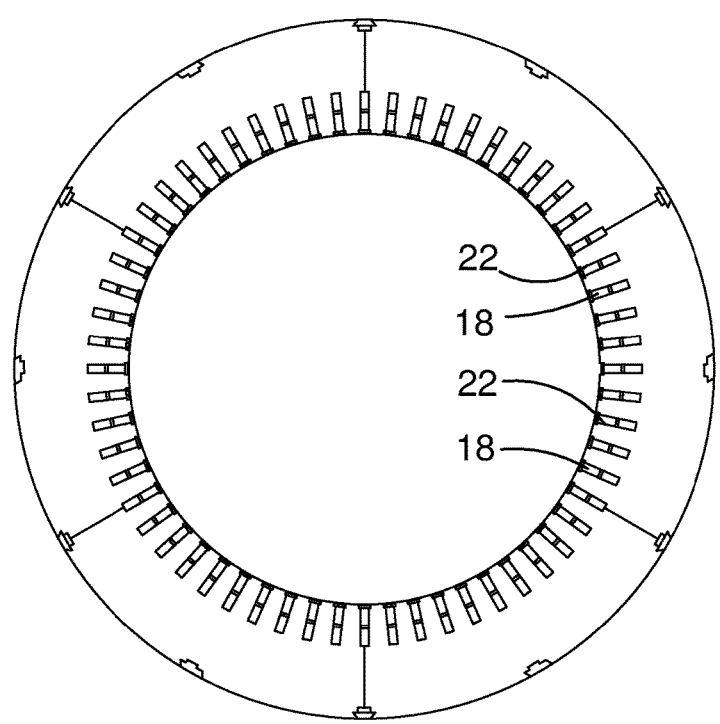
FIG. 2 shows an axial cross section through the stator.

FIG. 2 shows an axial cross section through the stator of the machine shown in FIG. 1. In this example the stator is formed from segmented stator laminations. A plurality of stator slots 22 are formed on the inside of the stator. Each of the stator slots 22 accommodates a stator winding 18. In this example the stator has four poles with 60 slots and 60 windings. Each coil has a span of about 60°. The machine is designed to be connected to a three phase electrical grid, and so the stator windings are also connected in three phases, each with 20 coils.

Figure 3:
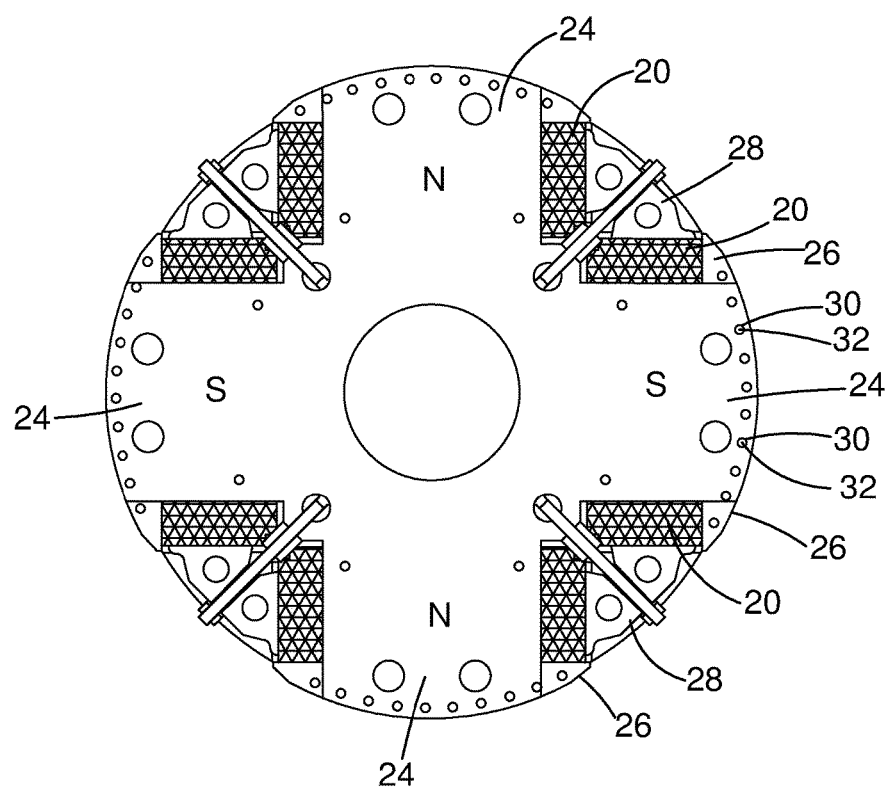
FIG. 3 shows an axial cross section through the rotor.

FIG. 3 shows an axial cross section through the rotor of the machine shown in FIG. 1. The rotor comprises a plurality of salient poles 24, each of which is wound with a rotor winding 20. Pole shoes 26 extend circumferentially from the ends of the poles, in order to provide support for the windings 20. The total width of a rotor pole is about ⅔ of the distance between adjacent poles. Wedges 28 are provided between the poles in order to keep the windings in place during operation of the machine.

The windings 20 are arranged such that, for each adjacent pole, the current through the windings flows in the opposition direction. In this way the salient poles are alternately magnetised as north and south poles during operation of the machine.

The rotor of FIG. 3 includes damper slots 30 running axially through the rotor near the surface of the salient poles 24. The damper slots 30 carry damper bars 32, which are formed from a non-magnetic, electrically conductive material such as copper or aluminium. The damper bars 32 are connected at each end by a damper ring. The damper bars 32 help to dampen out any oscillations in the rotation of the machine or other irregularities which may be caused by sudden changes in load or imbalances between electrical phases. The damper bars are sometimes referred to as a squirrel cage.

In the arrangement of FIG. 3, each of the poles has an outside surface which is curved, with a centre of curvature offset slightly in a radial direction from the axis of rotation. Thus the outside surfaces of the poles have a radius of curvature which is slightly less than would be the case for a rotor with a concentric outer surface. This results in a machine with a graded air gap, since the size of the air gap between the rotor and the stator increases gradually in a circumferential direction away from the centre of the pole.

Figure 4:
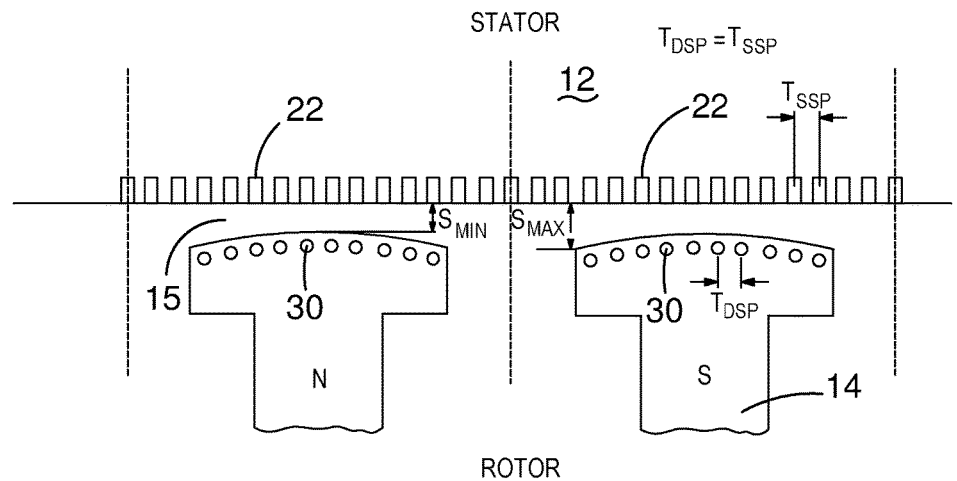
FIG. 4 is a schematic view of part of the stator and rotor.

FIG. 4 is a schematic view of part of the stator and rotor, showing a possible arrangement of stator slots and damper slots. In FIG. 4, the stator slots 22 have a stator slot pitch $T_{SSP}$ while the damper slots 30 have a damper slot pitch $T_{DSP}$. When the rotor poles are aligned with the stator poles, the damper slots 30 are aligned with the stator slots 22, and have the same pitch.

Figure 5:
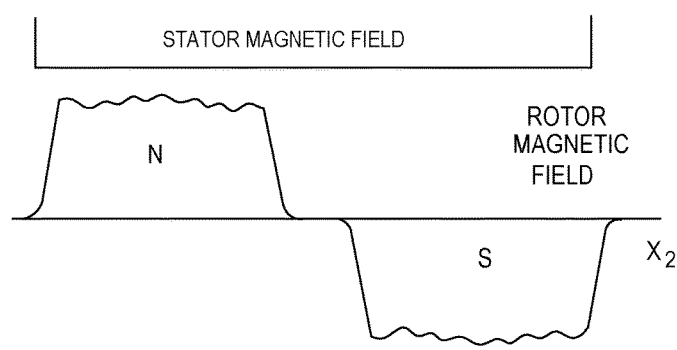
FIG. 5 shows schematically the magnetic fields generated by a rotor.

FIG. 5 shows schematically the magnetic fields generated by an arrangement such as that shown in FIG. 4. Referring to FIG. 5, the rotor magnetic field has a number of ripples due to the presence of the non-magnetic damper bars. These ripples in the magnetic field can lead to higher harmonics in the stator winding voltage.

When a synchronous generator is connected to a grid, it is necessary for the generator to conform to certain standards, known as grid codes, for example IEC 60034 and/or NEMA MG 1. The codes and standards may specify various parameters, such as Total Harmonic Distortion (THD), Telephone Harmonic Factor (THF) and Telephone Influence Factor (TIF) that must be kept within acceptable limits. THD is the ratio of the higher voltage harmonics to the fundamental frequency in the phase-to-phase voltage measured at no load conditions and rated voltage. THF is the ratio of the weighted higher voltage harmonics to fundamental frequency in the phase-to-phase voltage. B-TIF is similar to THF but with weighting factors of a different size. R-TIF is as B-TIF but considering phase to neutral voltage. For THF, B-TIF and R-TIF the higher voltage harmonics from 800 Hz to 4000 Hz are highly weighted.

It is therefore necessary to take measures when designing a synchronous generator to ensure that the harmonic distortion in the stator winding voltage is within acceptable limits. Conventionally this has been achieved through a technique known as skewing. In a skewed generator, either the stator core or the rotor core is arranged such that the windings run in a direction which is slightly offset from an axial direction of the machine. Typically the amount of skewing is one stator slot over the core length. Skewing reduces the influence of ripples in the rotor's magnetic field, thus reducing the harmonics in the output voltage.

A skewed generator can help to achieve an acceptable level of total harmonic distortion. However a skewed generator suffers from certain disadvantages, such as a reduction in power density, additional axial forces on the bearing, and a more complex design for manufacturing. Alternatively it would be possible to design a synchronous machine without damper bars. However this would generally require a massive rotor or a fly-wheel, and may not resolve issues relating to unbalanced load.

Figure 6:
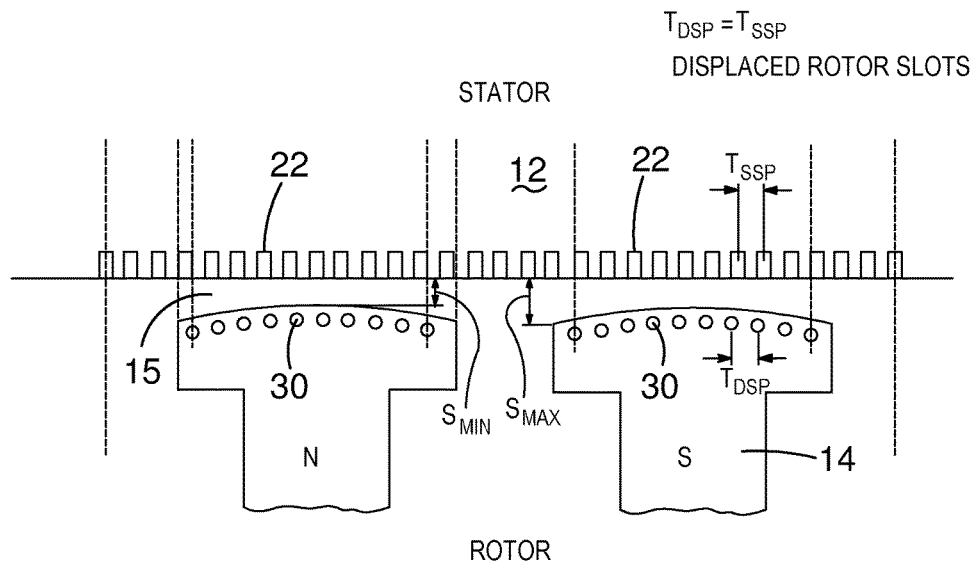
FIG. 6 is a schematic view of parts of a synchronous machine in one arrangement.

FIG. 6 is a schematic view of parts of a synchronous machine in another possible arrangement. In the arrangement of FIG. 6 the damper slots 30 have the same pitch as the stator slots 22, but are displaced with respect to the stator slots. The damper slots in the left hand pole of FIG. 6 are displaced to the right, while the damper slots in the right hand pole are displaced to the left. This arrangement is repeated around the rotor, so that for alternate poles the damper slots are displaced by an equal amount but in the opposite direction. As a consequence, the damper slots are arranged non-symmetrically about the centre of a pole, and their arrangement varies from one pole to another.

In the arrangement shown in FIG. 6, the damper slots in one pole are displaced by 25% of a stator slot pitch to the right of the stator slots, while the damper slots in the other pole are displaced by 25% of a stator slot pitch to the left of the stator slots. Since in this arrangement the damper slots have the same pitch as the stator slots, this is equivalent to displacing the damper slots by approximately 25% of a damper slot pitch.

FIG. 6 also shows that the air gap 15 between the rotor 14 and the stator 12 is graded. The air gap has a minimum value $S_{min}$ at the centre of the pole, and a maximum value $S_{max}$ at the ends of the pole shoes. In this example the ratio of $S_{max}$ to $S_{min}$ is equal to or greater than 120%.

Analysis has shown that a damper slot arrangement such as that shown in FIG. 6 can result in higher harmonics in the magnetic field being at least partially cancelled. This in turn can reduce the higher harmonics in the output voltage.

Calculated values of THD, THF, B-TIF and R-TIF for an un-skewed rotor design with the damper slot arrangements of FIG. 4 and FIG. 6 are shown in the table below.

|  | THD | THF | B-TIF | R-TIF |
| --- | --- | --- | --- | --- |
| No displacement | 3.89% | 6.04% | 276.6 | 6.5 |
| With displacement | 1.23% | 1.29% | 45.4 | 5.5 |
| Typical limits | 5% | 1.5% | 100 | 75 |

As can be seen from the table, for an un-skewed rotor design without damper slot displacement, the values of THF and B-TIF are well above typically acceptable limits. However the rotor design with damper slot displacement can reduce these values to within acceptable limits. In general it has been found that a preferred range of damper slot displacement is 20-30% of the stator slot pitch.

Figure 7:
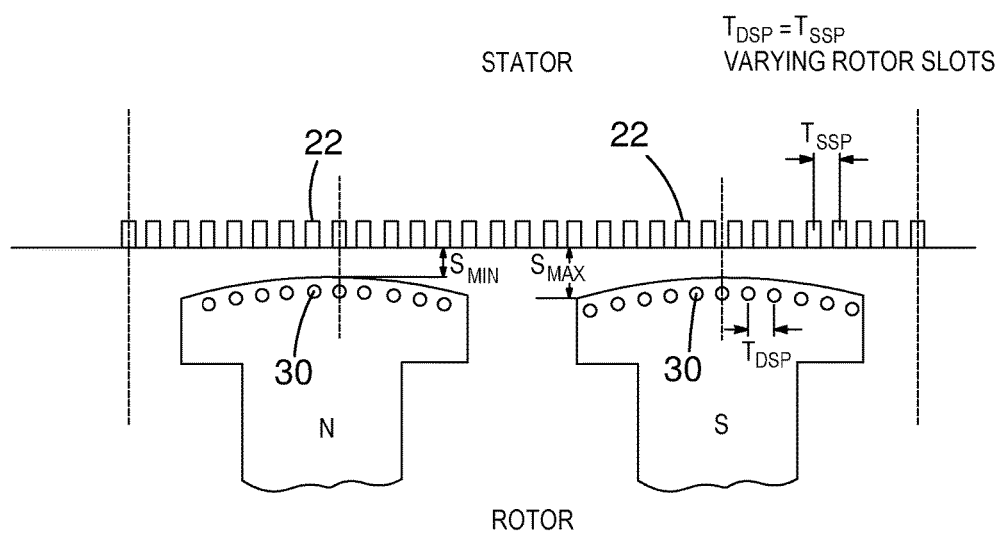
FIG. 7 is a schematic view of parts of a synchronous machine in another arrangement.

FIG. 7 is a schematic view of parts of a synchronous machine in another possible arrangement. In this arrangement, the number of damper slots is varied from one pole to another.

Referring to FIG. 7, the left hand pole has 10 damper slots, while the right hand pole has 11 damper slots. In the left hand pole the damper slots are aligned with the stator slots, while in the right hand pole the damper slots are displaced from the stator slots by 50% of a slot width. This arrangement is repeated around the rotor, so that the number of damper slots alternates between adjacent poles. In both cases the damper slots have a constant pitch, which is the same as that of the stator slots.

Although FIG. 7 shows a north pole with 10 damper slots and a south pole with 11 damper slots, the opposite arrangement is also possible, and the number of damper bars could vary by a different amount.

Figure 8:
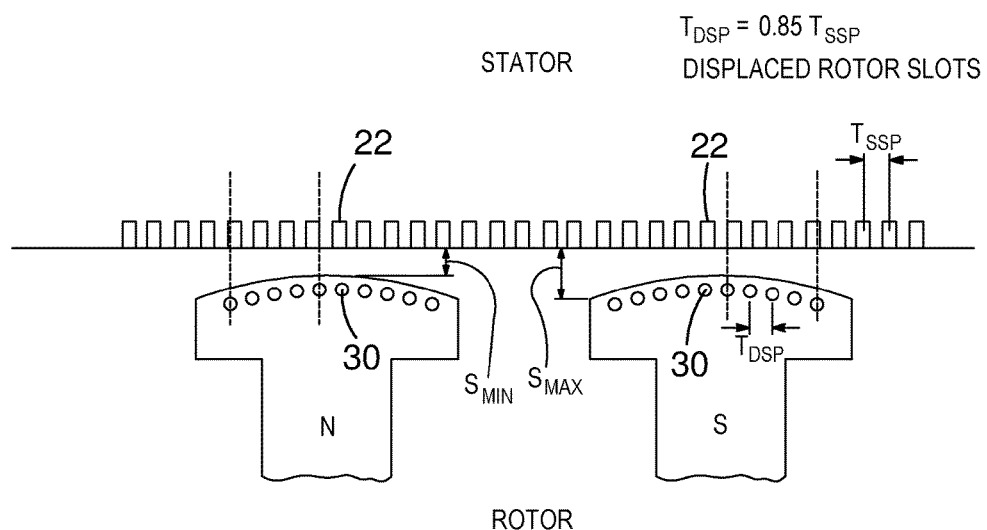
FIG. 8 is a schematic view of parts of a synchronous machine in a further arrangement.

FIG. 8 is a schematic view of parts of a synchronous machine in another possible arrangement. In the arrangement of FIG. 8 the damper slots 30 are displaced with respect to the stator slots in a similar way to that shown in FIG. 6. Thus the damper slots in the left hand pole of FIG. 8 are displaced to the right, while the damper slots in the right hand pole are displaced to the left. As a consequence, the damper slots are arranged non-symmetrically about the centre of a pole, and their arrangement varies from one pole to another. However, in addition, the damper slots have a pitch of 85% of the stator slot pitch.

Calculated values of THD, THF, B-TIF and R-TIF for a rotor design with both damper slot displacement and a reduced damper slot pitch are shown in the table below.

|  | THD | THF | B-TIF | R-TIF |
| --- | --- | --- | --- | --- |
| No displacement; equal pitch | 3.89% | 6.04% | 276.6 | 6.5 |
| With displacement and reduced pitch | 1.14% | 0.77% | 36.1 | 1.1 |
| Typical limits | 5% | 1.5% | 100 | 75 |

It can be seen that, by reducing the damper slot pitch with respect to the stator slot pitch, further improvements in the values of THD, THF, B-TIF and R-TIF can be achieved.

A similar effect can be achieved by increasing the damper slot pitch with respect to the stator slot pitch. For example, the damper slots may have a pitch of around 1.15% of the stator slots.

It will be appreciated that the above embodiments may be used either individually or in combination. For example, an altered damper slot pitch could be used in combination with varying the number of damper slots from one pole to another.

Synchronous electrical machines are sometimes produced as a standard basic machine with a number of different stator designs. The different stator designs may be needed, for example, to produce different output voltages or for supplying different output loads. For example, a machine with four different stator designs has been contemplated. Each of the stator designs has the same basic dimensions, but the number of stator slots is varied.

Typically in such a case it is necessary to design a separate rotor for each stator for an unskewed design. However it has been found that, by optimizing the rotor design and the damper slot arrangement, it may be possible to use a single rotor design with a number of different stator designs. This can allow a universal rotor design to be produced, thereby reducing the number of variants and hence the overall cost of production.

Analysis carried out by the present applicant has revealed that, in one embodiment, an optimized rotor design has the following characteristics:

A graded air gap, with the ratio of the air gap at the pole edge to the air gap at the centre of the pole being equal to or greater than 120%;

A damper slot pitch which is between 105% and 150%, or between 70% and 95%, of a stator slot pitch (or the stator slot pitches of all of the stators with which the rotor is to be used); and An alternating damper slot displacement of between 18% and 35% of a damper slot pitch (or a stator slot pitch), or an alternating damper slot number with a damper slot displacement of between 0% and 8% of a damper slot pitch.

Thus, in a preferred embodiment, the rotor is designed to satisfy the above characteristics for all of the stators with which the rotor is to be used.

Figure 9:
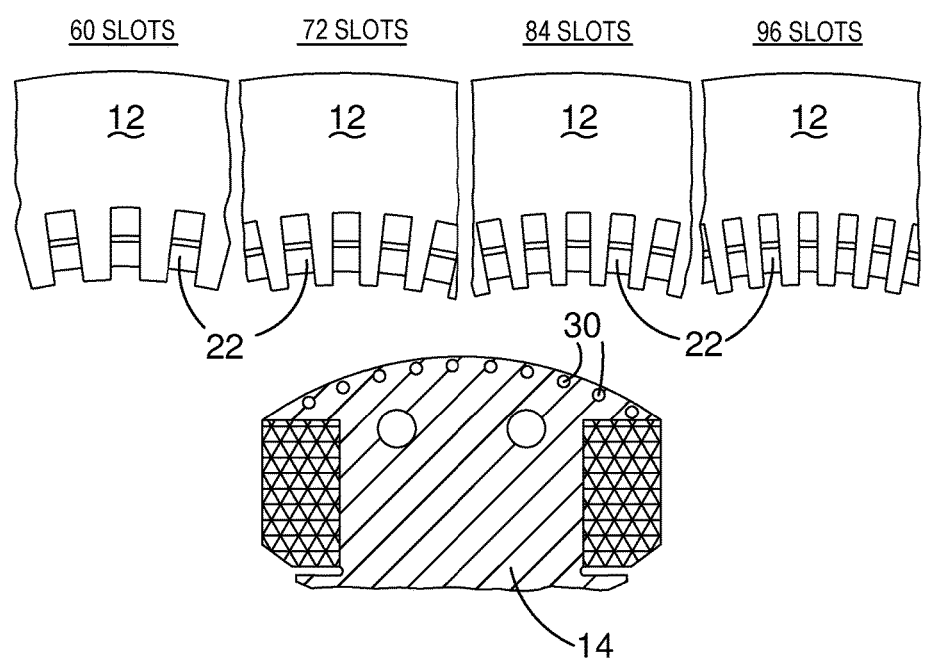
FIG. 9 shows schematically how a single rotor design may be used with a number of different stator designs.

FIG. 9 shows schematically how a single rotor design may be used with a number of different stator designs. The top part of FIG. 9 shows four different stator designs having respectively 60, 72, 84 and 96 stator slots. As the number of slots increases, the slot size and slot pitch decreases. The bottom half of FIG. 9 indicates how a single rotor design may be used with the four different stator designs.

In one embodiment, an optimized rotor design for use with a plurality of different stators has the following characteristics:

A graded air gap;

a damper slot displacement of 20-30% of a median stator slot pitch (or an average of the two median stator slot pitches); and a damper slot pitch which is between the slot pitches of two median slot pitches (or between the slot pitch of the stator with the median slot pitch and the stator with the next highest or lowest slot pitch).

Thus, in the case of the stator designs shown in FIG. 9, an optimized rotor design has a damper slot displacement which is between 20% and 30% of the average of the stator slot pitches of the stators with 72 slots and 84 slots. Furthermore, the rotor has a damper slot pitch which is between the stator slot pitch of the stator with 72 slots and the stator with 84 slots. In addition, the air gap is graded.

While preferred features have been described with reference to specific embodiments, it will be appreciated that variations or combinations of the various embodiments are possible within the scope of the invention. For example, a reduced or increased damper slot pitch could be used in combination with varying the number of damper slots from one pole to another. Furthermore, the present invention may be used with either a synchronous generator or a synchronous motor, or any other suitable machine. Various other modifications will be apparent to the skilled person.

The invention claimed is:

1. A synchronous rotating electrical machine, the machine comprising a stator with a plurality of stator slots arranged to accommodate stator windings, the stator slots having a stator slot pitch, the machine further comprising a rotor located inside the stator, wherein:

the rotor comprises a plurality of poles, each of the poles comprising a plurality of damper slots for damper bars;

the damper slots have a damper slot pitch which is between 105% and 150% or between 70% and 95% of the stator slot pitch;

the damper slots have an arrangement which varies from one pole to another;

the damper slot pitch varies either within a pole or between poles;

the rotor is arranged such that an air gap between the rotor and the stator is graded; and the machine is un-skewed.

2. A rotor according to claim 1, wherein the air gap is graded such that a ratio of the air gap at a pole edge to the air gap at the centre of the pole is equal to or greater than 120%.

3. A rotor according to claim 1, wherein the radius of the rotor is less at the edge of a pole than at the centre of a pole.

4. A rotor according to claim 1, wherein the damper slots are arranged non-symmetrically about a centre of the pole.

5. A rotor according to claim 1, wherein at least one pole has a damper slot arrangement which is displaced from the centre of the pole.

6. A rotor according to claim 5, wherein a damper slot arrangement is displaced by between 18% and 35% of a damper slot pitch.

7. A rotor according to claim 5, wherein adjacent poles have damper slot arrangements which are displaced from the centre of the pole in opposite directions.

8. A rotor according to claim 5, wherein adjacent poles have damper slot arrangements which are displaced from the centre of the pole by substantially equal and opposite amounts.

9. A machine according to claim 1, wherein the damper slots in a rotor pole are arranged such that, when the rotor pole is aligned with a stator pole, the damper slots are displaced with respect to the stator slots.

10. A machine according to claim 9, wherein the damper slots are displaced relative to the stator slots by between 18% and 35% of the stator slot pitch.

11. A machine according to claim 9, wherein the damper slots in one pole are displaced in the opposite direction to the damper slots in an adjacent pole.

12. A rotor according to claim 1, wherein the number of damper slots varies from one pole to another.

13. A rotor according to claim 12, wherein each pole has a damper slot arrangement which is displaced from the centre of the pole by between 0% and 8% of the damper slot pitch.

14. A rotor according to claim 12, wherein alternate poles have alternating numbers of damper slots.

15. A rotor according to claim 1, wherein the damper slots of one pole are arranged with respect to the damper slots of another pole such that, in operation, a harmonic in the rotor's magnetic field is reduced.

16. A rotor according to claim 1, wherein the damper slots run axially through the machine.

17. A rotor according to claim 1, further comprising damper bars located in the damper slots.

18. A set of parts for a synchronous rotating electrical machine, the set of parts comprising a plurality of stators with different stator designs, each stator comprising a plurality of stator slots for accommodating stator windings, the stator slots having a stator slot pitch, the set of parts further comprising a rotor, wherein:

the rotor comprises a plurality of poles, each of the poles comprising a plurality of damper slots for damper bars;

the damper slots have a damper slot pitch which is between 105% and 150% or between 70% and 95% of the stator slot pitches of all of the stators;

the damper slots have an arrangement which varies from one pole to another;

the damper slot pitch varies either within a pole or between poles;

the rotor is arranged such that an air gap between the rotor and the stator is graded; and the rotor is designed for use with a plurality of different stator designs each having a different number of stator slots and/or a different stator slot pitch.

19. A method of manufacturing a synchronous rotating electrical machine, the machine comprising a stator with a plurality of stator slots for accommodating stator windings, the stator slots having a stator slot pitch, and a rotor located inside the stator, the rotor comprising a plurality of poles, each of the poles comprising a plurality of damper slots for damper bars, the method comprising:

arranging the damper slots to have a damper slot pitch which is between 105% and 150% or between 70% and 95% of the stator slot pitch;

varying a damper slot arrangement from one pole to another;

the damper slot pitch varies either within a pole or between poles;

arranging the rotor such that an air gap between the rotor and the stator is graded; and arranging the machine to be un-skewed.

20. A synchronous rotating electrical machine the machine comprising a stator with a plurality of stator slots for accommodating stator windings, the stator slots having a stator slot pitch, the machine further comprising a rotor located inside the stator, wherein:

the rotor comprises a plurality of poles, each of the poles comprising a plurality of damper slots for damper bars;

the damper slots have a damper slot pitch which is between 105% and 150% or between 70% and 95% of the stator slot pitch;

the number of damper slots varies from one pole to another;

alternate poles have alternating numbers of damper slots;

each pole has a damper slot arrangement which is displaced from the centre of the pole by between 0% and 8% of the damper slot pitch;

the rotor is arranged such that an air gap between the rotor and the stator is graded; and the machine is unskewed.

* * * * *